Aug. 9, 1955 P. B. REEVES 2,714,822
SEALABLE ADJUSTABLE STOP FOR SANITARY
VARIABLE SPEED TRANSMISSION
Filed May 9, 1951 2 Sheets-Sheet 2
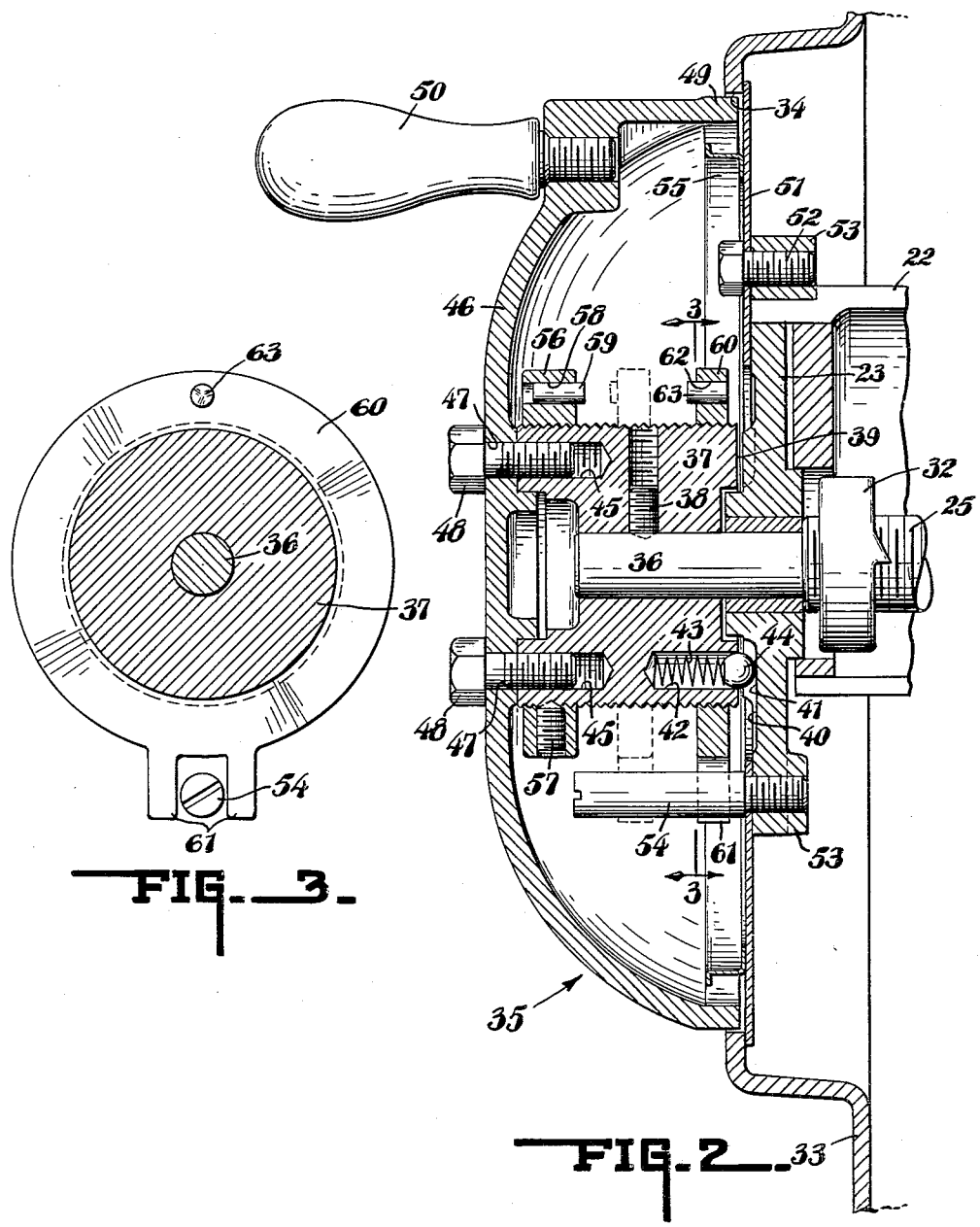
FIG._3_
FIG._2_
INVENTOR.
PAUL B. REEVES,
BY:
Harold B Hood.
ATTORNEY.

United States Patent Office 2,714,822
Patented Aug. 9, 1955

2,714,822

SEALABLE ADJUSTABLE STOP FOR SANITARY VARIABLE SPEED TRANSMISSION

Paul B. Reeves, Columbus, Ind., assignor, by mesne assignments, to Reliance Electric and Engineering Company, Cleveland, Ohio, a corporation of Ohio Application May 9, 1951, Serial No. 225,386

5 Claims. (Cl. 74—509)

The present invention relates to an adjustable stop means primarily intended for variable speed transmissions of a well-known type, and the primary object of the invention is to provide a means for limiting adjustment of the transmission, in at least one direction, such means being normally enclosed, but being accessible for resetting without removing the transmission housing. The invention is primarily applicable to units which are associated with machines or processes which must be protected from grease, dirt and the like; and the invention is primarily designed to avoid the necessity for taking down the transmission housing, with the attendant dangers of dislodging refuse or dirt or permitting lubricant drip, when it becomes necessary to reset a limit stop on the transmission.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is a vertical section through the stop mechanism, drawn to an enlarged scale; and Fig. 3 is a fragmentary section taken substantially on the line 3—3 of Fig. 2.

Figure 1:
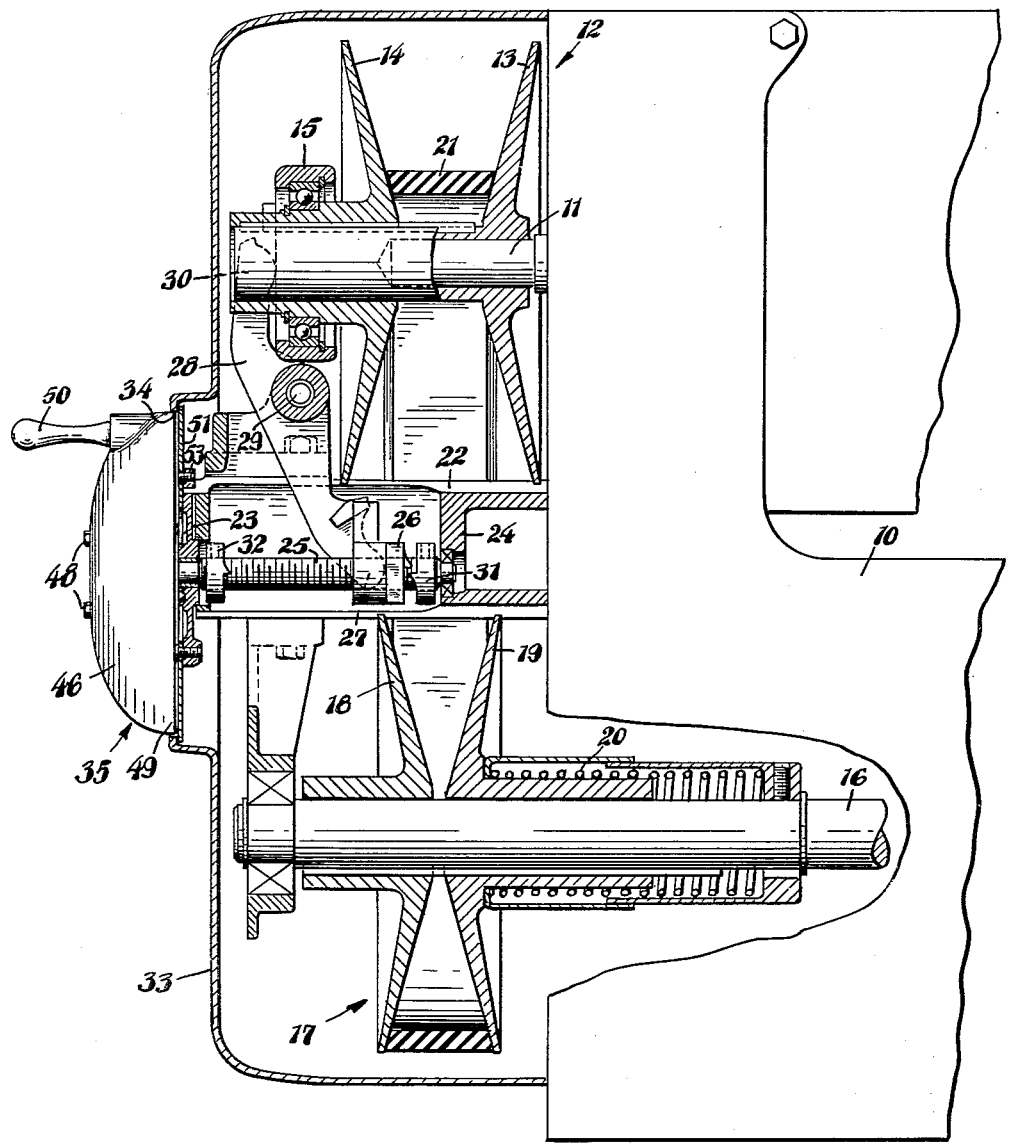
Fig. 1 is a fragmentary view of a variable speed transmission of conventional form with which my adjustable stop is shown associated.

Referring more particularly to the drawings, it will be seen that I have illustrated a main frame 10 in which is suitably supported a first shaft 11 which, as indicated, may be a motor spindle. An expansible V-pulley, indicated generally by the reference numeral 12, is supported upon the shaft 11, said pulley comprising a coned disc 13 fixed to the shaft 11 and a mating coned disc 14 which is axially adjustable relative to its mate. As shown, the disc 14 carries a thrust bearing 15 for a purpose which will later appear. The transmission comprises a second shaft 16 suitably journalled in the frame, and supporting a second expansible V-pulley indicated generally by the reference numeral 17. The pulley 17 comprises a coned disc 18 fixed to the shaft 16, and a mating coned disc 19 axially adjustable relative to the disc 18, and resiliently urged toward said disc 18 by means of a spring 20. An edge active belt 21 provides a driving connection between the pulleys 12 and 17.

A frame element 22 includes a member 23 in which, and in a web 24, is journalled a screw shaft 25 upon which is threadedly mounted a nut 26, held against rotation by one end 27 of a lever 28 which is pivotally mounted, intermediate its ends, as at 29, upon an element of the frame. The opposite end 30 of the lever 28 engages the thrust bearing 15, whereby the position of the nut 26 controls the position of the disc 14.

It will be readily apparent that, as the screw shaft 25 is rotated in one direction, the nut 26 will be moved toward the left, as viewed in Fig. 1, to swing the lever 28 in a clockwise direction about its pivot 29. Thereby, the end 30 of the lever, bearing against the thrust bearing 15, will force the disc 14 to move toward its fellow 13. Assuming that the shafts 11 and 16 are rotating, the belt 21 will thus be crowded outwardly between the discs 13 and 14, and will be pulled more deeply into the V defined by the discs 18 and 19, thereby forcing the disc 19 to move toward the right against the tendency of the spring 20. As a consequence of this adjustment, the effective diameter of the pulley 12 upon the belt 21 will be increased, while the effective diameter of the pulley 17 will be decreased, whereby the velocity of the shaft 16, relative to the velocity of the shaft 11, will be increased. Rotation of the shaft 25 in the opposite direction will move the nut 26 toward the right to permit the lever 28 to swing in a counter-clockwise direction, whereupon the spring 20 will force the disc 19 toward its fellow 18, crowding the belt outwardly between those discs and pulling it inwardly between the discs 13 and 14 to force the disc 14 to move away from its fellow 13 following the movement of the end 30 of the lever 28.

Conventionally, stop members 31 and 32 are threadedly mounted on the shaft 25 for adjustment therealong, and are adapted to be fixed in any desired position of adjustment. Obviously, the positions of the members 31 and 32 will limit the throw of the nut 26, thereby limiting the degree of adjustment of the pulleys 12 and 17. The member 31 is conventionally referred to as the low-limit stop, while the member 32 is conventionally referred to as the high-limit stop.

Access to the stop members 31 and 32, however, can be attained only by removing the shaft 25 bodily from the assembly; and such removal obviously requires dismounting or removal of the lever 28. In most applications of devices of the character here under consideration, a housing 33 encloses the entire transmission; and it will be clear from an inspection of Fig. 1 that removal of such housing must necessarily precede dismounting or removal of the lever 28.

Obviously, lubrication of one kind or another must be provided for facilitating the axial adjustment of the discs 14 and 19, and as obviously there is necessarily some wear on the belt 21 which produces dust within the housing 33. Where such units are used in the food industry, in connection with chemical processes, or in similar situations, it is, of course, essential to avoid dislodgement of such dust and to avoid the dripping of lubricant from the assembly. Therefore, I have provided means whereby the limiting position of the nut 26 may be adjusted without manipulation of the stops 31 and 32 and without disturbing the housing 33. Such means should desirably be normally housed to prevent unauthorized tampering; and I have provided for such enclosure and at the same time have so devised my adjustable stop means that the enclosure within which it is housed is protected from dirt, oil and the like which may be present in the main housing. The details of my stop means are illustrated more clearly in Figs. 2 and 3.

According to conventional structure, the housing 33 is provided with an opening 34 which registers with the screw shaft 25; and said screw shaft is normally provided with an outboard projection 36 upon which a hand wheel is conventionally fixed. According to the present invention, my adjustable stop means, indicated generally by the reference numeral 35, is substituted for the conventional hand wheel.

An externally threaded hub 37 is centrally bored so that said hub may be mounted upon the outboard projection 36 of the screw shaft 25, and said hub carries a set screw 38 whereby the hub may be fixed to said shaft projection with one end 39 of said hub located closely adjacent the outer surface 40 of the frame member 23. Preferably, said frame member surface 40 will be provided with an annular, serrated track 41; and the hub 37 will be formed with an axially-extending socket 42 opening through the end 39 of said hub. A coiled spring 43 is seated within the socket 42 and bears against a ball 44, confined in said socket, said spring urging said ball into the serrated trackway 41, whereby the hub, and so the shaft 25, will be resiliently held in any desired position of rotational adjustment.

The hub 37 is further formed with two or more tapped sockets 45 opening through its opposite end; and a domed hand wheel 46 is formed with a similar number of perforations 47, adjacent its center, to be penetrated by machine screws 48 enterable in the sockets 45, whereby said hand wheel may be mounted upon and fixed to the hub 37. The perimeter 49 of the domed hand wheel 46 projects substantially into the plane of the face 40 of the frame member 23, and enters the opening 34 in the housing 33. It is to be noted that, by this assembly arrangement, the hub 37 and its associated parts will be housed within the domed hand wheel 46; yet, through the manipulation of the externally accessible screws 48, the hand wheel may be removed from the assembly to expose the hub 37 and its associated parts. A handle 50 may be carried by the wheel 46 to facilitate manipulation thereof. To prevent unauthorized tampering with the adjustment of the stop 56, the heads of the screws 48 may be transaxially bored, and a sealing wire may be threaded therethrough and suitably sealed by an inspector or other authorized individual. It will also be noted that, with the arrangement disclosed, it is possible to open the main chamber for repair or adjustment of the transmission without exposing or affecting the stop means within the hand wheel 46.

An annular shield 51 is secured to the frame through the medium of a plurality of screws 52 taking into tapped lugs 53; and it will be noted that one of said screws 54 is provided with an elongated head or shank projecting into the interior of the wheel 46 for a purpose later to become apparent. The shield 51, at its inner periphery, bears against the face 40 of the frame element 23; and at its outer periphery, said shield bears against the inner surface of the housing 33 beyond the periphery of the opening 34. It will be seen that the perimeter of the wheel 46 extends substantially into contact with the shield 51, so that said shield and said hand wheel effectively close the chamber within which the hub 37 and its associated parts are housed. Preferably, an axially-projecting annular flange 55 will be supported upon the shield 51, adjacent the periphery of the wheel and projecting into the interior of said wheel, as shown.

A stop nut 56 is threadedly mounted on the hub 37 and carries a set screw 57 engageable with said hub to fix said nut in any desired position of adjustment relative to the hub. Near its periphery, said nut 56 is formed with an eccentric socket or bore 58, and a pin 59 is received in said socket and projects axially from the rear or inner face of the nut. A second nut or traveler 60 is threadedly mounted on the hub 37, and the nut 60 is provided with a pair of furcations 61 straddling the head of the screw 54, whereby said nut 60 is held against rotation with the hub 37. The nut 60 is formed with an eccentric bore or socket 62, parallel with the axis of the hub 37, and a pin 63 is received in said socket 62 and projects toward the nut 56. The pins 59 and 63 are substantially equidistant from the axis of the hub 37.

Now, it will be clear that, as the hand wheel 46 is rotated, the screw head 54 will hold the nut 60 against rotation so that, because of the threaded association of the nut with the hub 37, said nut will be caused to travel axially along the hub 37. The stop nut 56, on the other hand, will rotate with the hub and, since the pin 63 is located on the circle of travel of the pin 59, said pin 59 will strike the pin 63, when the nut 60 closely approaches the nut 56, to limit further rotation of the hand wheel. The sum of the projection of the pins 59 and 63 toward each other exceeds the pitch of the thread on the hub 37, so that the facing surfaces of the two nuts can never come into contact to produce a frictional jam therebetween.

It will be clear that, since the interior of the hand wheel is sealed from the interior of the housing 33 by the shield 51, and is substantially closed from the atmosphere by the projection of the wheel perimeter 49 into the housing opening 34, there is substantially no possibility of accumulation of dirt within said chamber. Thus, when it is desired to adjust the setting of the stop member 56, the hand wheel 46 may be removed from the assembly, by removal of the screws 48, without fear of dislodging dirt which might fall into the processes with which the apparatus is associated. Since there are relatively few moving parts in the stop mechanism, and since those parts require substantially no lubrication, danger of dripping oil is also avoided.

It will be obvious that, if the thread of the hub 37 is the same hand as the thread of the shaft 25, the illustrated mechanism will constitute a high-limit stop used in substitution for the stop 32. If the thread of the hub 37 is of the opposite hand, or if the positions of the elements 56 and 60 are reversed, the stop 56 will constitute a low-limit stop used in substitution for the stop 31. It will also be clear that, without structural modification, a second stop nut 56 could be mounted upon the inner end of the hub 37, so that the nut 60 would move between two stop elements mounted at opposite ends of the hub 37. In such case, of course, the pin 63 would be elongated to project equally beyond opposite faces of the nut 60.

I claim as my invention:

1. In a device of the class described, a shaft, and a self-contained, limit-stop hand wheel assembly mounted on said shaft, said assembly comprising a domed hand wheel element, an externally threaded hollow hub coaxially secured to said hand wheel element and housed therewithin, a stop element mounted for axial adjustment relative to said hub, a nut threadedly mounted on said hub, means for restraining said nut against rotation, said hub being sleeved on said shaft, and means fixing said hub to rotate with said shaft.

2. In a device of the class described, a shaft, and a self-contained limit-stop hand wheel assembly mounted on said shaft, said assembly comprising a domed hand wheel element, an externally threaded hollow hub coaxially secured to said hand wheel element and housed therewithin, a stop element threadedly mounted on said hub, means for fixing said stop element against rotation relative to said hub, a nut threadedly mounted on said hub, means for restraining said nut against rotation, said hub being sleeved on said shaft, and means fixing said hub to rotate with said shaft.

3. For use with a shaft journalled in a frame element and having an end projecting outboard therefrom, a self-contained limit-stop hand wheel assembly for actuating such a shaft, comprising an externally threaded hub constructed and arranged to be sleeved on such a shaft end with one end of said hub located closely adjacent such a frame element, means carried by said hub and engageable with such a shaft to fix said hub to such shaft, the opposite end of said hub being formed with a plurality of tapped, axially-extending sockets, a domed wheel, screw means penetrating said wheel adjacent the center thereof and entering said sockts to fix said wheel to said hub, the perimeter of said wheel extending substantially into the plane of said first-named hub end to house said hub, a stop element housed within said wheel and adjustable axially relative to said hub, means for securing said stop element in adjusted position relative to said hub, a nut threadedly mounted on said hub, and means fixed relative to said frame element and engaging said nut to restrain the same against rotation with said hub.

4. For use with a shaft journalled in a frame element and having an end projecting outboard therefrom, an externally threaded hub sleeved on said shaft end with one end of said hub located closely adjacent said frame element, means carried by said hub and engaging said shaft to fix said hub to said shaft, the opposite end of said hub being formed with a plurality of tapped, axially-extending sockets, a domed wheel, screw means penetrating said wheel adjacent the center thereof and entering said sockets to fix said wheel to said hub, the perimeter of said wheel extending substantially into the plane of said first-named hub end to house said hub, a stop element housed within said wheel and adjustable axially relative to said hub, means for securing said stop element in adjusted position relative to said hub, a nut threadedly mounted on said hub, means fixed relative to said frame element and engaging said nut to restrain the same against rotation with said hub, an annular, serrated track on said frame element concentric with said shaft, said hub being formed with a further axially-extending socket opening through said first-named hub end, a spring seated in said socket, and a ball confined in said socket, riding in said track, and urged toward said track by said spring.

5. For use with a shaft journalled in a frame element and having an end projecting outboard therefrom, an externally threaded hub sleeved on said shaft end with one end of said hub located closely adjacent said frame element, means carried by said hub and engaging said shaft to fix said hub to said shaft, the opposite end of said hub being formed with a plurality of tapped, axially-extending sockets, a domed wheel, screw means penetrating said wheel adjacent the center thereof and entering said sockets to fix said wheel to said hub, the perimeter of said wheel extending substantially into the plane of said first-named hub end to house said hub, a stop element housed within said wheel and adjustable axially relative to said hub, means for securing said stop element in adjusted position relative to said hub, a nut threadedly mounted on said hub, means fixed relative to said frame element and engaging said nut to restrain the same against rotation with said hub, an annular, axially extending drip shield supported from said frame element, located adjacent the perimeter of said wheel, and projecting into the interior of said wheel.

References Cited in the file of this patent

UNITED STATES PATENTS

| 1,060,383 | Valentine | Apr. 29, 1913 |
| 1,109,516 | Dalton | Sept. 1, 1914 |
| 2,277,004 | Reeves | Mar. 17, 1942 |
| 2,342,941 | Johnson | Feb. 29, 1944 |
| 2,356,861 | Link | Aug. 29, 1944 |
| 2,398,235 | Luenberger | Apr. 9, 1946 |
| 2,417,434 | Mead et al. | Mar. 18, 1947 |
| 2,569,006 | King | Sept. 25, 1951 |

FOREIGN PATENTS

| 186,322 | Germany | June 20, 1907 |